(12) United States Patent
Yamamoto et al.

(10) Patent No.: US 8,079,078 B2
(45) Date of Patent: Dec. 13, 2011

(54) ENCRYPTION APPARATUS, PROGRAM FOR USE THEREWITH, AND METHOD FOR USE THEREWITH

(75) Inventors: Hideo Yamamoto, Kanagawa (JP); Naofumi Hanaki, Kanagawa (JP); Katsuyuki Teruyama, Tokyo (JP); Tomohiko Nagayama, Tokyo (JP); Masahiro Sueyoshi, Kanagawa (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 11/024,726

(22) Filed: Dec. 30, 2004

(65) Prior Publication Data

US 2005/0207570 A1 Sep. 22, 2005

(30) Foreign Application Priority Data

Jan. 9, 2004 (JP) ................................. 2004-004827

(51) Int. Cl.
*G06F 7/04* (2006.01)
*G06F 15/16* (2006.01)
*G06F 17/30* (2006.01)
*H04L 29/06* (2006.01)

(52) U.S. Cl. ............... 726/17; 726/4; 726/27; 713/153; 713/155; 713/168; 380/59; 380/255; 380/277

(58) Field of Classification Search .................. 380/28
See application file for complete search history.

(56) References Cited

U.S. PATENT DOCUMENTS

| | | | |
|---|---|---|---|
| 4,186,871 A * | 2/1980 | Anderson et al. ............... 705/71 |
| 5,239,584 A * | 8/1993 | Hershey et al. ................. 380/28 |
| 5,301,247 A * | 4/1994 | Rasmussen et al. ............. 380/43 |
| 5,452,358 A * | 9/1995 | Normile et al. ................. 380/42 |
| 5,828,751 A * | 10/1998 | Walker et al. .................. 713/175 |
| 5,870,477 A * | 2/1999 | Sasaki et al. ................... 713/165 |
| 5,881,231 A * | 3/1999 | Takagi et al. ................... 709/212 |
| 6,173,400 B1 * | 1/2001 | Perlman et al. ................. 713/172 |
| 6,259,790 B1 * | 7/2001 | Takagi et al. .................... 380/30 |
| 6,772,339 B1 * | 8/2004 | Jakobsson et al. ............. 713/168 |
| 7,065,215 B2 * | 6/2006 | Shirakawa et al. ............. 380/277 |
| 7,434,062 B2 * | 10/2008 | Erez ............................... 713/184 |

(Continued)

FOREIGN PATENT DOCUMENTS

EP 0 518 315 A2 12/1992

(Continued)

OTHER PUBLICATIONS

"Password Cracking Strategies," Brunati et al., Revision 1.0, Password Security Research Team, Open Information System Security Research Group, 2004.*

(Continued)

*Primary Examiner* — Nasser Moazzami
*Assistant Examiner* — Oscar Louie
(74) *Attorney, Agent, or Firm* — Oblon, Spivak, McClelland, Maier & Neustadt, L.L.P.

(57) ABSTRACT

An encryption apparatus capable of effectively preventing encryption data from being illegally generated is provided. Based on apparatus identification data of an integrated circuit (IC), which is input from a computer, a secure application module (SAM) selects an encryption method from among a plurality of different encryption methods. Based on the code of the IC, the SAM selects plaintext data to be encrypted from among the plurality of different pieces of plaintext data. The SAM outputs encryption data such that the selected plaintext data is encrypted by the selected encryption method.

17 Claims, 9 Drawing Sheets

U.S. PATENT DOCUMENTS

| | | | |
|---|---|---|---|
| 2002/0051536 A1* | 5/2002 | Shirakawa et al. | 380/45 |
| 2002/0064283 A1* | 5/2002 | Parenty | 380/277 |
| 2002/0071562 A1* | 6/2002 | Parenty | 380/278 |
| 2002/0114450 A1* | 8/2002 | Rose | 380/28 |
| 2002/0136407 A1* | 9/2002 | Denning et al. | 380/258 |
| 2003/0033537 A1* | 2/2003 | Fujimoto et al. | 713/193 |
| 2004/0230800 A1* | 11/2004 | Futa et al. | 713/169 |
| 2005/0226408 A1* | 10/2005 | Hotz | 380/28 |
| 2006/0112270 A1* | 5/2006 | Erez | 713/168 |

FOREIGN PATENT DOCUMENTS

| | | |
|---|---|---|
| EP | 518315 A2 * | 12/1992 |
| EP | 1 372 119 A1 | 12/2003 |
| JP | 64 81087 | 3/1989 |
| JP | 8-30745 | 2/1996 |
| JP | 9-179950 | 7/1997 |
| JP | 9-179951 | 7/1997 |
| JP | 11-15940 | 1/1999 |
| JP | 2000-36015 | 2/2000 |
| JP | 2002-312707 | 10/2002 |
| JP | 2003-345664 | 12/2003 |

OTHER PUBLICATIONS

"Rainbowcrack Tutorial," Shuanglei, Sep. 9, 2003.*
"John the Ripper Tutorial," Renegade et al., Dec. 21, 2003.*
"L0phtcrack 1.5 Lanman/NT password hash cracker," Mudge et al., Jul. 12, 1997.*
Patent Abstracts of Japan, JP 2001-308844, Nov. 2, 2001.
Patent Abstracts of Japan, JP 2003-229848, Aug. 15, 2003.

* cited by examiner

| IDM1 | M1 |
|------|----|
| IDM2 | M2 |
| ⋮ | ⋮ |
| IDMn | Mn |

TDA

FIG. 5B

| CODE1 | P1 |
|-------|----|
| CODE2 | P2 |
| ⋮ | ⋮ |
| CODEm | Pm |

TDB

ENCRYPTION APPARATUS, PROGRAM FOR USE THEREWITH, AND METHOD FOR USE THEREWITH

BACKGROUND OF THE INVENTION

1. Field of the Invention

The present invention relates to an encryption apparatus for generating encryption data, a program for use therewith, and a method for use therewith.

2. Description of the Related Art

For example, an authentication system performs authentication by using encryption data generated by an encryption apparatus. Based on, for example, correspondence table data for indicating a correspondence relationship between input data and plaintext data, such an encryption apparatus specifies plaintext data corresponding to the input data, and encrypts the specified plaintext data in order to generate encryption data. A conventional encryption apparatus encrypts the above-described specified plaintext data by a predetermined single encryption method.

However, in the above-described conventional encryption apparatus, since only a single encryption method is adopted, if the above-described correspondence table data and encryption method are illegally obtained, the encryption data can be illegally generated. For this reason, in an authentication system using such an encryption apparatus, there have been demands for preventing encryption data from being illegally generated and for increasing authentication reliability.

The present invention has been made in view of such a situation. An object of the present invention is to provide an encryption apparatus capable of effectively preventing encryption data from being illegally generated, a program for use therewith, and a data processing apparatus for use therewith.

To achieve the above-mentioned object, in a first aspect, the present invention provides an encryption apparatus for generating encryption data on the basis of specified identification data, the encryption apparatus including: first selection means for selecting an encryption method from among a plurality of different encryption methods on the basis of the identification data; second selection means for selecting plaintext data to be encrypted from among a plurality of different pieces of the plaintext on the basis of the identification data; and encryption means for obtaining encryption data such that the plaintext data selected by the second selection means is encrypted by the encryption method selected by the first selection means.

In the encryption apparatus in accordance with the first aspect of the present invention, the first selection means may select an encryption method from among a plurality of different encryption methods on the basis of the identification data. The second selection means may select plaintext data to be encrypted from among a plurality of different pieces of the plaintext on the basis of the identification data. The encryption means may obtain encryption data such that the plaintext data selected by the second selection means is encrypted by the encryption method selected by the first selection means.

In a second aspect, the present invention provides a program executed by a data processing apparatus for generating encryption data on the basis of specified identification data, the program enabling the data processing apparatus to execute processing including: a first procedure for selecting an encryption method from among a plurality of different encryption methods on the basis of the identification data; a second procedure for selecting plaintext data to be encrypted from among a plurality of different pieces of plaintext data on the basis of the identification data; and a third procedure for obtaining encryption data such that the plaintext data selected in the second procedure is encrypted by the encryption method selected in the first procedure.

In the program in accordance with the second aspect of the present invention, in the first procedure of the program, the data processing apparatus may select an encryption method from among a plurality of different encryption methods on the basis of the identification data. In the second procedure, the data processing apparatus may select plaintext data to be encrypted from among a plurality of different plaintext data on the basis of the identification data. In the third procedure, the data processing apparatus may obtain encryption data such that the plaintext data selected in the second procedure is encrypted by the encryption method selected in the first procedure.

In a third aspect, the present invention provides a data processing method for use with a data processing apparatus for generating encryption data on the basis of specified identification data, the data processing method including: a first step of selecting an encryption method from among a plurality of different encryption methods on the basis of the identification data; a second step of selecting plaintext data to be encrypted from among a plurality of different pieces of plaintext data on the basis of the identification data; and a third step of obtaining encryption data such that the plaintext data selected in the second step is encrypted by the encryption method selected in the first step.

In the data processing method in accordance with the third aspect of the present invention, in the first step, the data processing apparatus selects an encryption method from among a plurality of different encryption methods on the basis of the identification data. In the second step, the data processing apparatus selects plaintext data to be encrypted from among a plurality of different pieces of plaintext data on the basis of the identification data. In the third step, the data processing apparatus obtains encryption data such that the plaintext data selected in the second step is encrypted by the encryption method selected in the first step.

According to the present invention, it is possible to provide an encryption apparatus capable of effectively preventing encryption data from being illegally generated, a program for use therewith, and a data processing apparatus for use therewith.

DESCRIPTION OF THE PREFERRED EMBODIMENTS

A card system according to an embodiment of the present invention is described below.

First Embodiment

Figure 1:
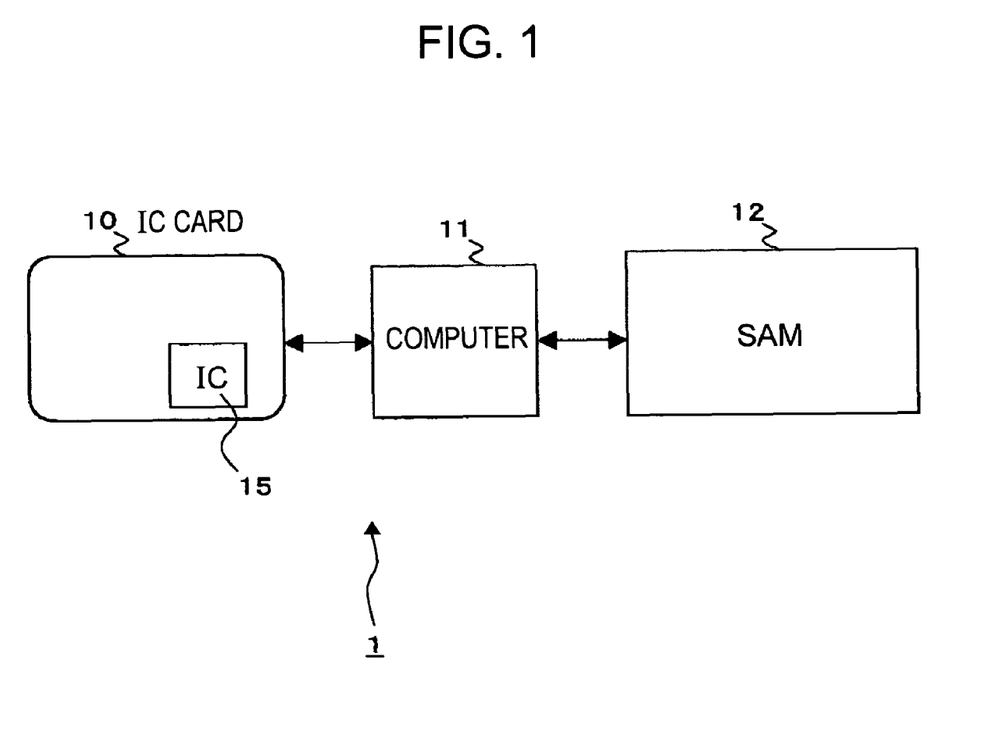
FIG. 1 is a block diagram of a card system according to a first embodiment of the present invention.

FIG. 1 is a block diagram of a card system 1 of this embodiment. As shown in FIG. 1, in the card system 1, for example, after an IC (Integrated Circuit) 15 of an IC card 10 and a SAM (Secure Application Module) 12 perform authentication via a computer 11, they perform processing for predetermined services in cooperation. Here, the SAM 12 corresponds to an encryption apparatus of the present invention, and the IC 15 corresponds to an output source of the present invention.

The IC 15, as will be described later, has stored therein data on various kinds of services received by a user of the IC 15 by using the SAM 12 and program file data, and usage authorization is set to services in which the file data is used.

The SAM 12 accepts, from the IC 15 via the computer 11, apparatus identification data IDM unique to the IC 15 and code CODE for identifying services to be authenticated (specified services to be received using the IC 15). The SAM 12 selects an encryption method from among a plurality of different encryption methods on the basis of the apparatus identification data IDM. Furthermore, based on the code CODE, the SAM 12 selects plaintext data to be encrypted from among the plurality of different pieces of plaintext data. Then, the SAM 12 outputs, to the IC 15, encryption data such that the selected plaintext data is encrypted by the selected encryption method.

The SAM 12 and the IC 15 perform authentication on the basis of the encryption data, and perform processing for the above-described services in cooperation on condition that the mutual validities are confirmed.

Each component shown in FIG. 1 is described below.

[IC 15]

Figure 2:
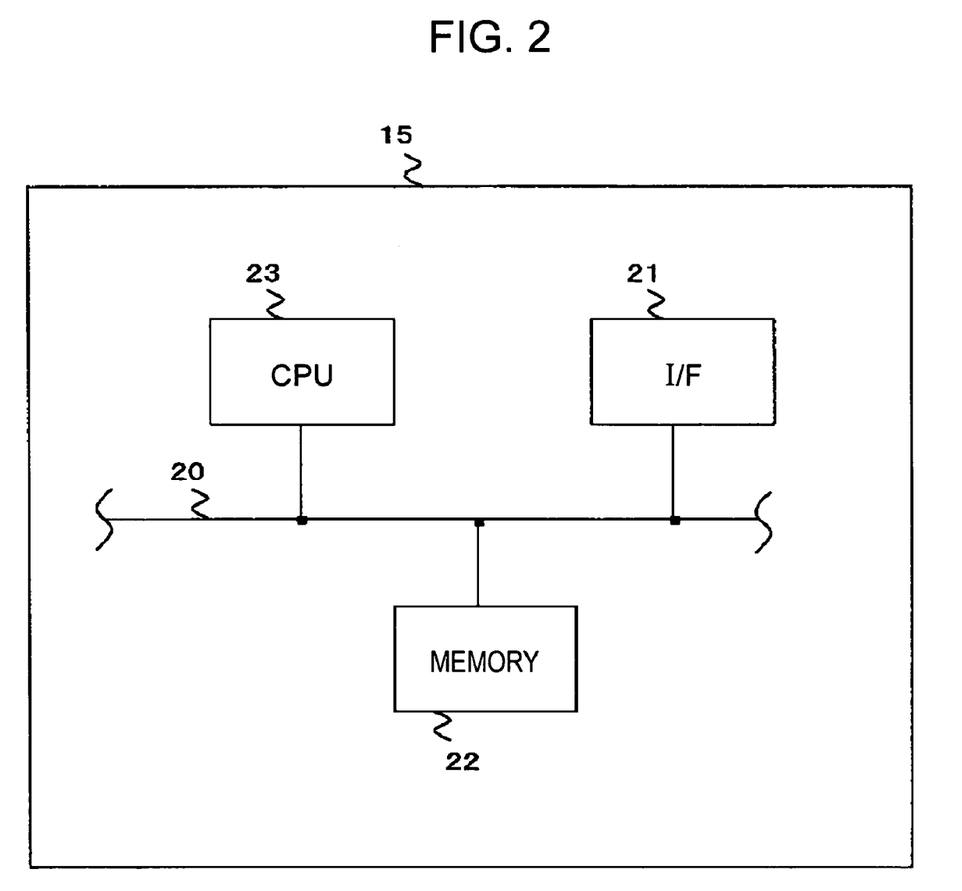
FIG. 2 is a block diagram of an IC incorporated in an IC card shown in FIG. 1.

FIG. 2 is a block diagram of the IC 15 incorporated in the IC card 10 shown in FIG. 1.

As shown in FIG. 2, the IC 15 includes, for example, an interface 21, a memory 22, and a CPU 23, these being interconnected with one another via an internal bus 20. The IC 15 is, for example, an anti-tampering electronic circuit, which is configured in such a way that data stored in the memory 22 and data being processed by the CPU 23 cannot be externally monitored or tampered (difficult to tamper).

The interface 21 performs input/output of data with the SAM 12 via the computer 11.

Figure 3:
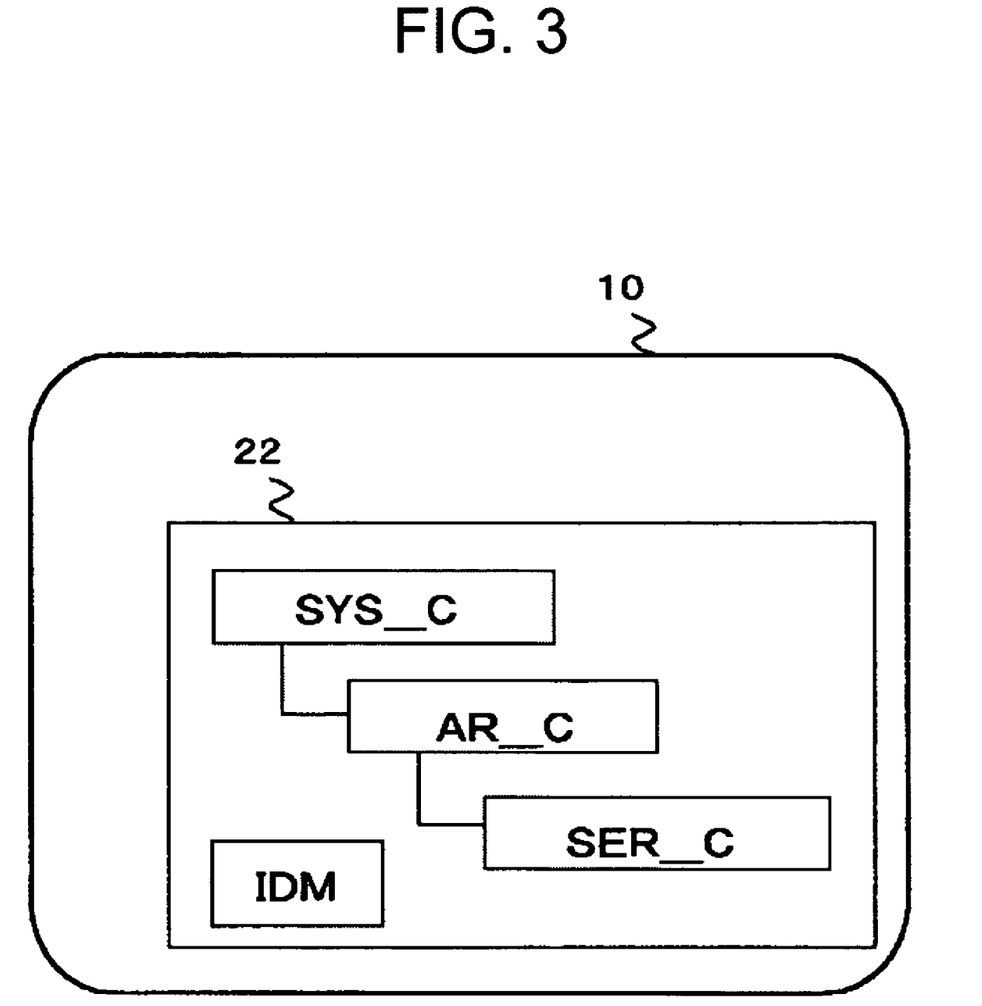
FIG. 3 illustrates data defined within the IC shown in FIG. 1.

The memory 22, as shown in FIG. 3, has stored therein apparatus identification data IDM unique to an individual IC card 10. Furthermore, the memory 22 has stored therein data and program file data used for processing various kinds of services received by the user of the IC 15 by using the SAM 12.

For example, as shown in FIG. 3, the memory 22 has stored therein system code SYS_C, area code AR_C, and service code SER_C. The system code SYS_C, the area code AR_C, and the service code SER_C are output as codes CODE to the SAM 12 via the computer 11. In this embodiment, the codes CODE are used to identify an object for authentication corresponding to the services specified by the user.

The system code SYS_C is identification data assigned commonly to the SAM 12 belonging to the same system. Based on the system code SYS_C and key data corresponding to it, the IC 15 and the SAM 12 perform mutual authentication. On condition that the mutual validities are confirmed, the access to the IC 15 by the SAM 12 is permitted.

The file data of various kinds of services stored in the memory 22 is stored in areas, which are folders each having a hierarchical structure. Each area is associated with the area code AR_C for identifying the area, and the key data.

In this embodiment, based on the area code AR_C and the key data associated with it, the IC 15 and the SAM 12 perform mutual authentication. On condition that the mutual validities are confirmed, the access to the area by the SAM 12 is permitted. Furthermore, the file data for providing various kinds of services stored in the area is associated with the service code SER_C for identifying the file data, and the key data.

In this embodiment, based on the service code SER_C and the key data associated with it, the IC 15 and the SAM 12 perform mutual authentication. On condition that the mutual validities are recognized, the access to the file data by the SAM 12 is permitted.

Based on the program and the key data read from the memory 22, the CPU 23 exchanges data with the SAM 12 via the interface 21 and the computer 11 in order to perform mutual authentication with the SAM 12. When the CPU 23 confirms the mutual validities in the above-described mutual authentication, the CPU 23 performs processing for services associated with the key data used in the mutual authentication in cooperation with the SAM 12.

[Computer 11]

Upon receiving the indication of services from the user of the IC card 10 via an operation section (not shown), the computer 11 reads the apparatus identification data IDM and the code CODE from the IC 15 of the IC card 10, and outputs them to the SAM 12.

The codes CODE are system code SYS_C, and the area code AR_C and the service code SER_C, both of which correspond to the indicated services.

In this embodiment, when predetermined services are specified in response to the operation of the computer 11 by the user, the computer 11 accepts, for example, the system code SYS_C of the IC 15 as the code CODE from the IC 15, and outputs it to the SAM 12.

When the mutual validities are confirmed in the mutual authentication using the system code SYS_C between the IC 15 and the SAM 12, then, the computer 11 specifies the area in which the file data on the specified services is stored, and accepts the area code AR_C of the specified area from the IC 15.

When the mutual validities are confirmed in the mutual authentication, in which the area code AR_C is used, between the IC 15 and the SAM 12, then, the computer 11 accepts, from the IC 15, the service code SER_C associated with the file data on the specified services.

Then, when the mutual validities are confirmed in the mutual authentication in which the service code SER_C is used between the IC 15 and the SAM 12, processing for predetermined services is performed between the IC 15 and the SAM 12 in cooperation on the basis of the file data.

[SAM 12]

Figure 4:
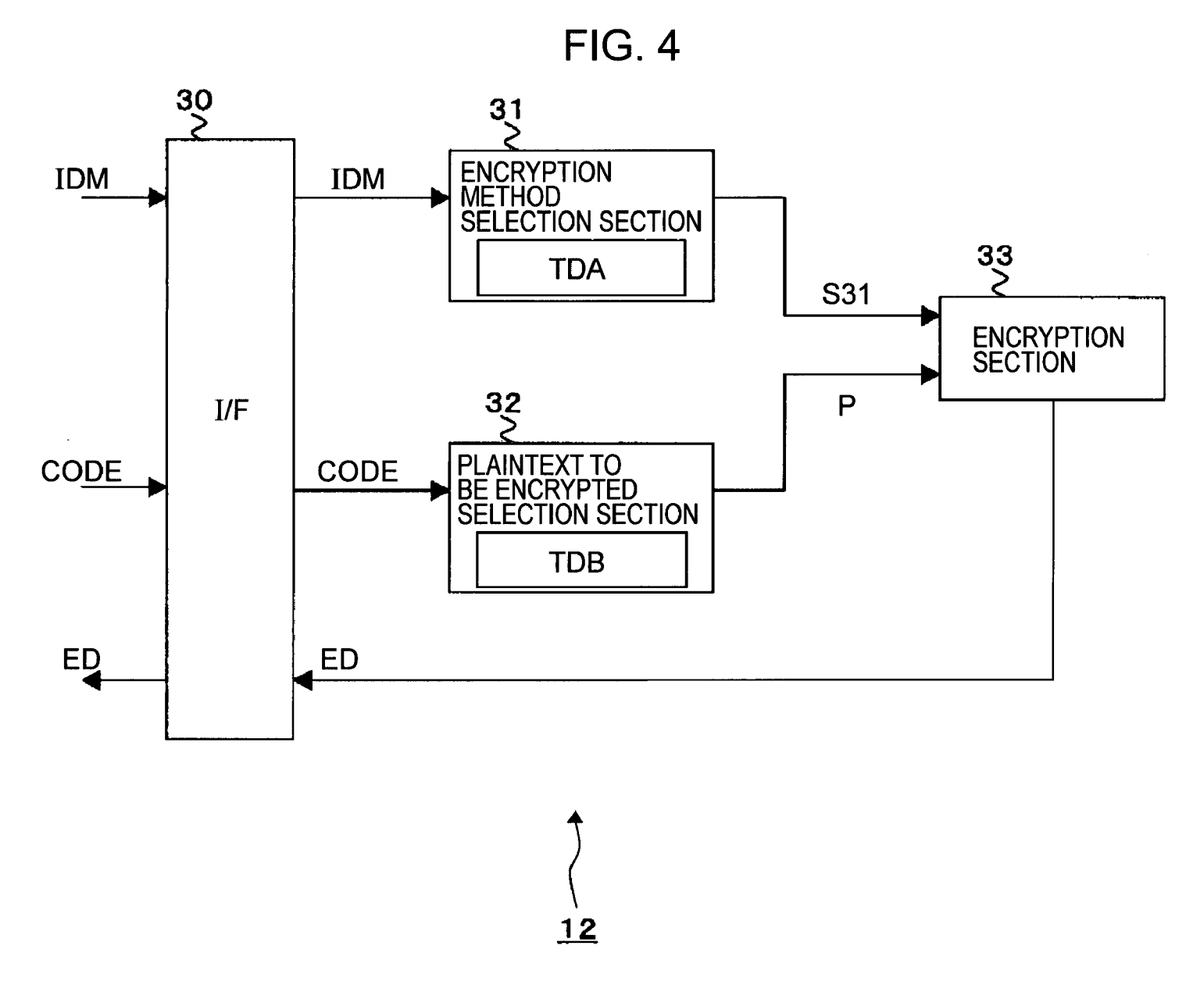
FIG. 4 is a function block diagram of a SAM shown in FIG. 1.

FIG. 4 is a block diagram of the SAM 12 shown in FIG. 1. As shown in FIG. 4, the SAM 12 includes, for example, an interface 30, an encryption method selection section 31, an plaintext to be encrypted selection section 32, and an encryption section 33. In this embodiment, the interface 30, the encryption method selection section 31, the plaintext to be encrypted selection section 32, and the encryption section 33 are realized by, for example, electronic circuits.

Here, the encryption method selection section 31 corresponds to the first selection means in accordance with the first aspect of the present invention; the plaintext to be encrypted selection section 32 corresponds to the second selection means in accordance with the second aspect of the present invention; and the encryption section 33 corresponds to the encryption means in accordance with the first aspect of the present invention. The SAM 12 is, for example, an antitampering electronic circuit, which is configured in such a way that data stored in the SAM 12 and data being processed cannot be externally monitored or tampered (difficult to tamper).

The interface 30 outputs apparatus identification data IDM (first identification data of the present invention) input from the computer 11 to the encryption method selection section 31. Furthermore, the interface 30 outputs the code CODE (second identification data of the present invention) input from the computer 11 to the plaintext to be encrypted selection section 32. In addition, the interface 30 outputs encryption data ED input from the encryption section 33 to the computer 11.

Figure 5A:
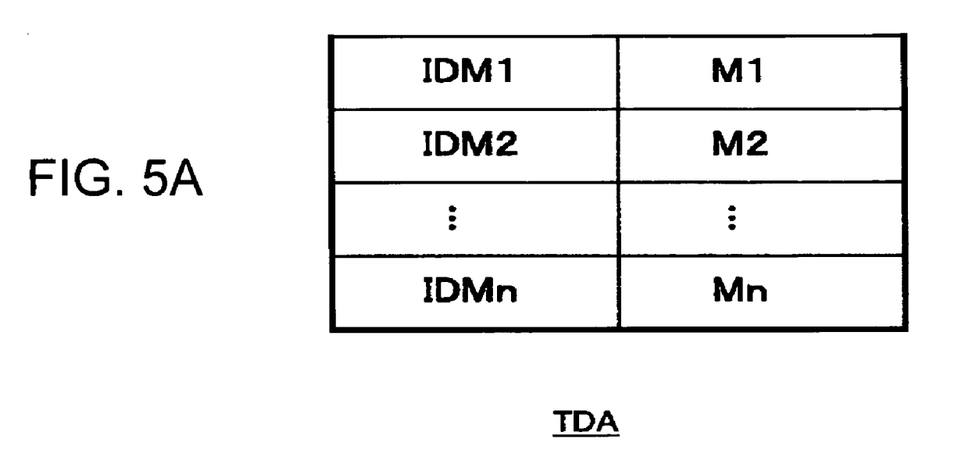
FIG. 5A illustrates correspondence table data TDA held by an encryption method selection section shown in FIG. 4.

As shown in FIG. 5A, the encryption method selection section 31 has correspondence table data TDA indicating the encryption methods M1 to Mn corresponding to a plurality of pieces of the apparatus identification data IDM1 to IDMn, respectively. Based on the correspondence table data TDA shown in FIG. 5A, the encryption method selection section 31 selects a single or a plurality of encryption methods M1 to Mn corresponding to the apparatus identification data input from the interface 30, and outputs selection data S31 indicating the selected encryption method to the encryption section 33.

All or some of the encryption methods M1 to Mn are encryption methods differing from one another, and are, for example, public-key encryption methods and common-key encryption methods. In all or some of the encryption methods M1 to Mn, for example, the encryption strengths and the amounts (loads) of encryption processing differ from one another. Such differences are realized, for example, by using key data of a different data length for encryption.

In one example, since narrow band characteristics are required for the apparatus identification data IDM of the IC 15 incorporated into, for example, a mobile phone device for performing wireless communication, the common-key encryption method is associated as the encryption method. With respect to the apparatus identification data IDM of the IC 15 incorporated into the IC card 10 for performing settlements, the realization of a high level of security takes priority. Therefore, the public-key encryption method is associated as the encryption method. The encryption method of this embodiment may be processing for performing editing on plaintext data P in addition to an encryption process performed on the basis of secret key data, public key data, common key data, and so on.

Figure 5B:
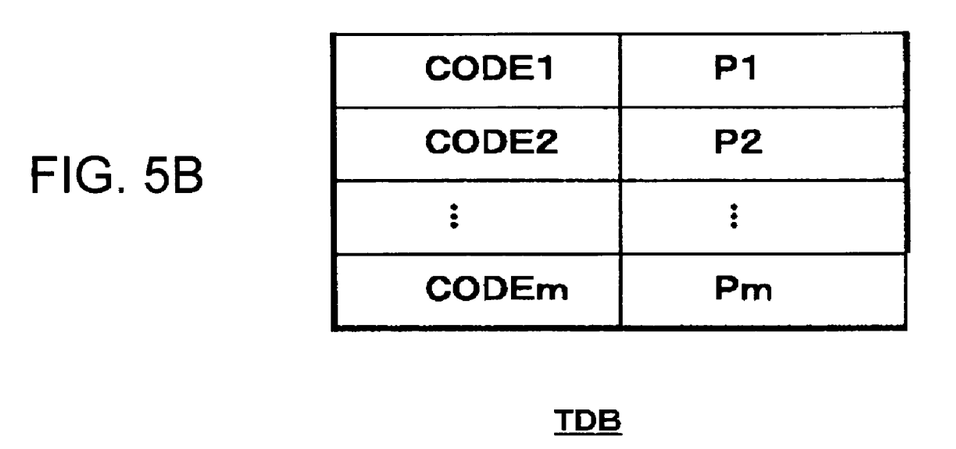
FIG. 5B illustrates correspondence table data TDB held by a plaintext to be encrypted selection section shown in FIG. 4.

As shown in FIG. 5B, the plaintext to be encrypted selection section 32 has correspondence table data TDB indicating plaintext data P1 to Pm corresponding to a plurality of codes CODE. The plaintext data P1 to Pm is, for example, mutually different data.

Based on the correspondence table data TDB shown in FIG. 5B, the plaintext to be encrypted selection section 32 selects the plaintext data P1 to Pm input from the interface 30, and outputs the selected plaintext data P to the encryption section 33.

The encryption section 33 encrypts the plaintext data P input from the plaintext to be encrypted selection section 32 by the encryption method indicated by the selection data S31 input from the encryption method selection section 31 in order to generate encryption data ED, and outputs it to the interface 30.

An example of the operation of the card system 1 shown in FIG. 1 is described below.

Figure 6:
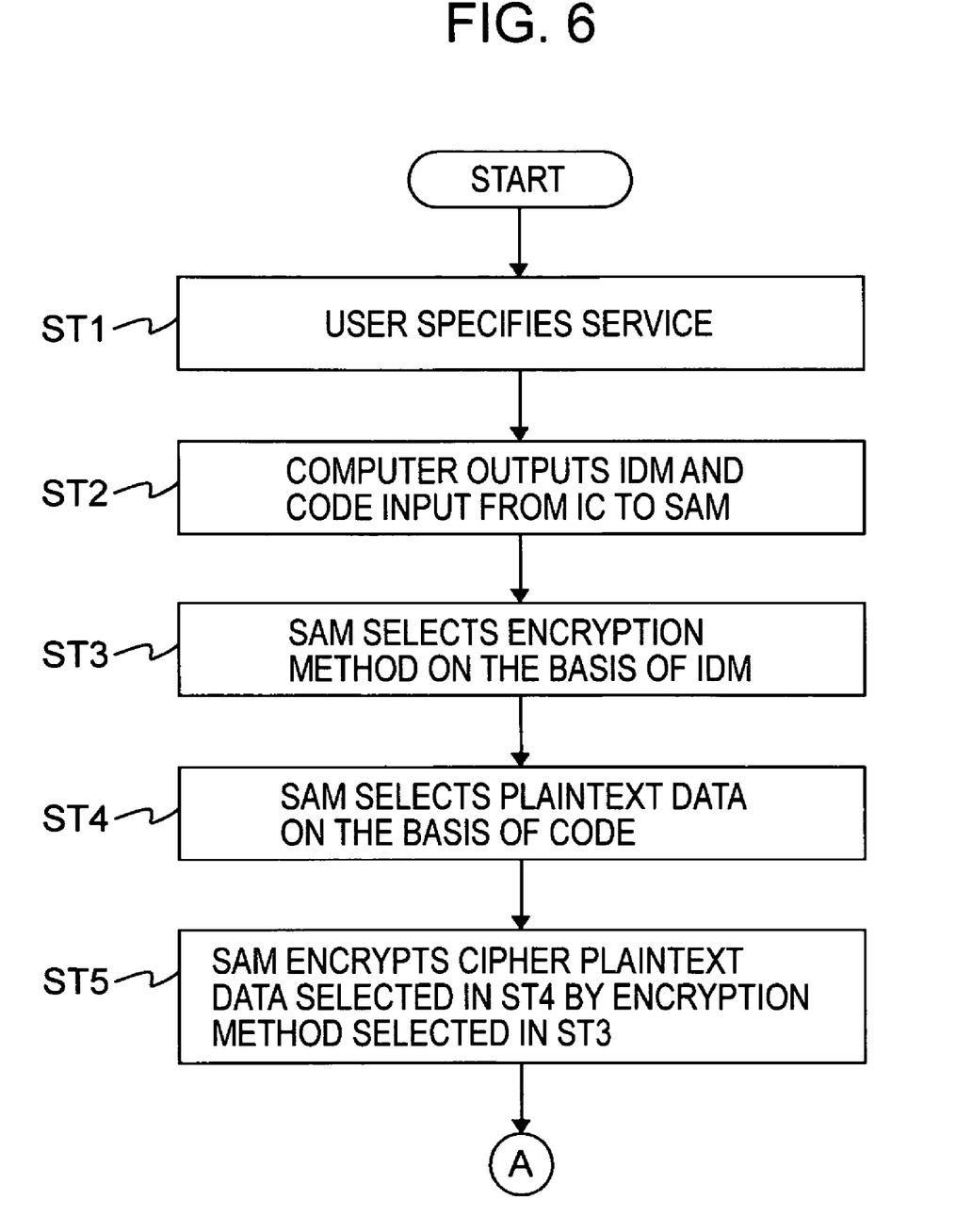
FIG. 6 is a flowchart illustrating an example of the operation of the card system shown in FIG. 1.

In step ST1, a user of the IC card 10 inputs an indication of services to be received by using the IC card 10 via an operation section (not shown) of the computer 11.

In step ST2, in response to the indication input in step ST1, the computer 11 reads the apparatus identification data IDM and the code CODE corresponding to the indication from the memory 22 of the IC 15 of the IC card 10 shown in FIG. 2, and outputs them to the SAM 12. The SAM 12 outputs the apparatus identification data IDM input via the interface 30 shown in FIG. 4 to the encryption method selection section 31. Furthermore, the SAM 12 outputs the code CODE input via the interface 30 to the plaintext to be encrypted selection section 32.

In step ST3, based on the correspondence table data TDA shown in FIG. 5A, the encryption method selection section 31 selects the encryption methods M1 to Mn corresponding to the apparatus identification data IDM input in step ST2, and outputs the selection data S31 indicating the encryption method to the encryption section 33.

In step ST4, based on the correspondence table data TDB shown in FIG. 5B, the plaintext to be encrypted selection section 32 selects the plaintext data P1 to Pm corresponding to the code CODE input in step ST2, and outputs the selected plaintext data P to the encryption section 33.

In step ST5, the encryption section 33 encrypts the plaintext data P input from the plaintext to be encrypted selection section 32 in step ST4 by the encryption method indicated by the selection data S31 input from the encryption method selection section 31 in step ST3 in order to generate encryption data ED.

Figure 7:
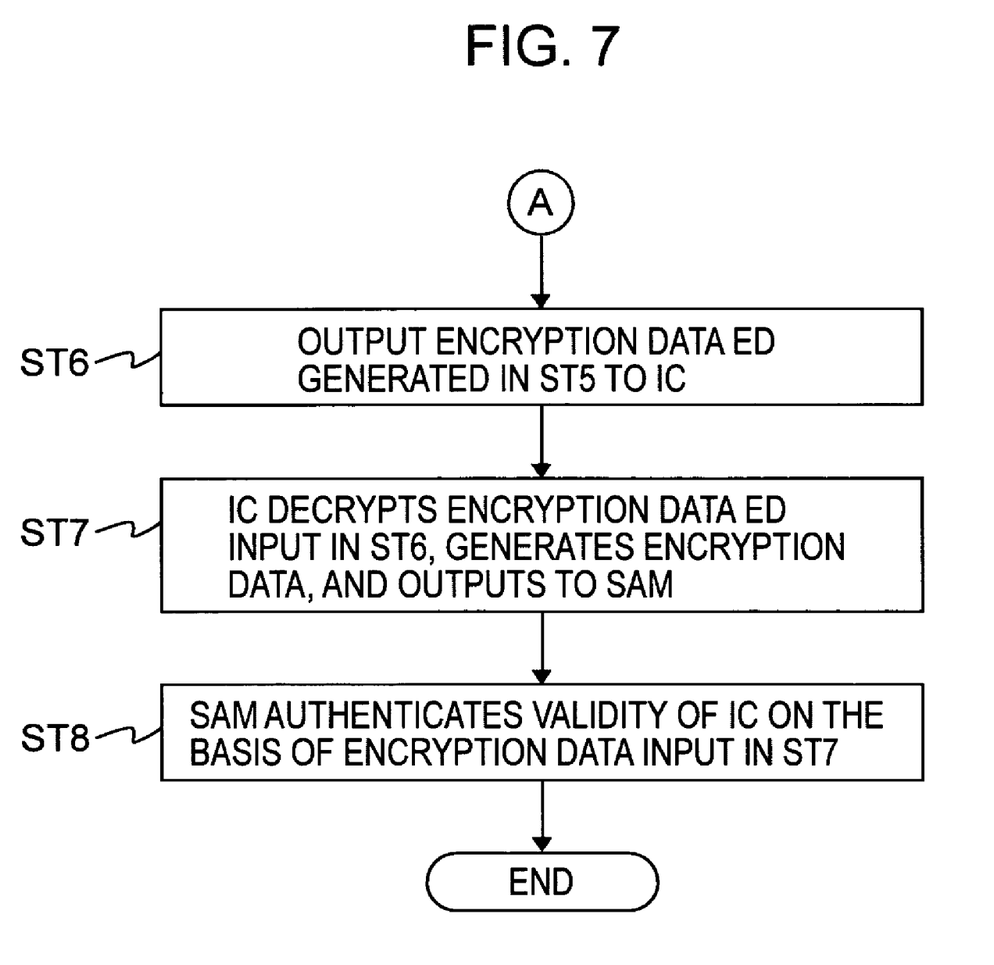
FIG. 7 is a flowchart continuing from FIG. 6 illustrating the example of the operation of the card system shown in FIG. 1.

In step ST6, the encryption section 33 outputs the encryption data ED generated in step ST5 to the computer 11 via the interface 30. The computer 11 outputs the input encryption data ED to the IC 15.

In step ST7, the CPU 23 of the IC 15 decrypts the encryption data ED input in step ST6 by using the key data corresponding to the encryption data ED in order to generate decrypted data.

Furthermore, the CPU 23 encrypts the decrypted data on the basis of predetermined key data in order to generate encrypted data. The CPU 23 outputs the encrypted data to the SAM 12 via the interface 21 and the computer 11.

In step ST8, the SAM 12 authenticates the validity of the IC 15 on the basis of the encryption data input from the IC 15 in step ST7.

As has thus been described, according to the SAM 12, as described with reference to FIGS. 4 and 5, in addition to selecting plaintext data P1 to Pm corresponding to the respective codes CODE, the encryption methods M1 to Mn corresponding to the respective apparatus identification data IDM are selected. Therefore, even in the case of the same code CODE, if the apparatus identification data IDM differs, the encryption data ED obtained by encrypting the code CODE differs. For this reason, even if the correspondence table data TDB leaks illegally, the identification as to which encryption method the plaintext data P is encrypted with cannot be made, and therefore, the encryption data ED cannot be illegally generated. As a result, the authentication reliability between the SAM 12 and the IC 15 can be improved.

Modification of the First Embodiment

In the above-described embodiment, as the first identification data of the present invention, the apparatus identification data IDM unique to an individual IC card 10 is described as an example. Alternatively, the first identification data may be identification data indicating the security level of the authentication performed with the IC card 10 or may be identification data specified in accordance with the processing load of the authentication. That is, in addition to the identification data unique to the individual IC card 10, the identification data shared among a plurality of IC cards 10 may also be used as the first identification data of the present invention.

In the above-described embodiment, the encryption performed by the encryption section 33 on the basis of the selection data S31 generated by the encryption method selection section 31 includes an encryption in which, for example, the encryption section 33 has individual programs for a plurality of encryption methods in advance and the associated program is selected and executed on the basis of the selection data S31. In addition, the encryption may also be performed in such a way that the selection data S31 indicating the script of the encryption method selected by the encryption method selection section 31 is output to the encryption section 33, and the encryption section 33 interprets the script and executes it.

Furthermore, the encryption method selection section 31 may generate selection data S31 indicating a plurality of encryption methods rather than a single encryption method from among the encryption methods M1 to Mn and the processing procedures thereof, and may output them to the encryption section 33. In this case, the encryption section 33 performs an encryption process using a plurality of specified encryption methods on the plaintext data P input from the plaintext to be encrypted selection section 32 in accordance with the processing procedure specified by the selection data S31 in order to generate the encrypted data ED.

Second Embodiment

In the above-described first embodiment, an example is described in which the encryption section 33 of the SAM 12 actually encrypts the plaintext data P input from the plaintext to be encrypted selection section 32 by the encryption method indicated by the selection data S31 input from the encryption method selection section 31 in order to generate the encryption data ED.

Figure 8:
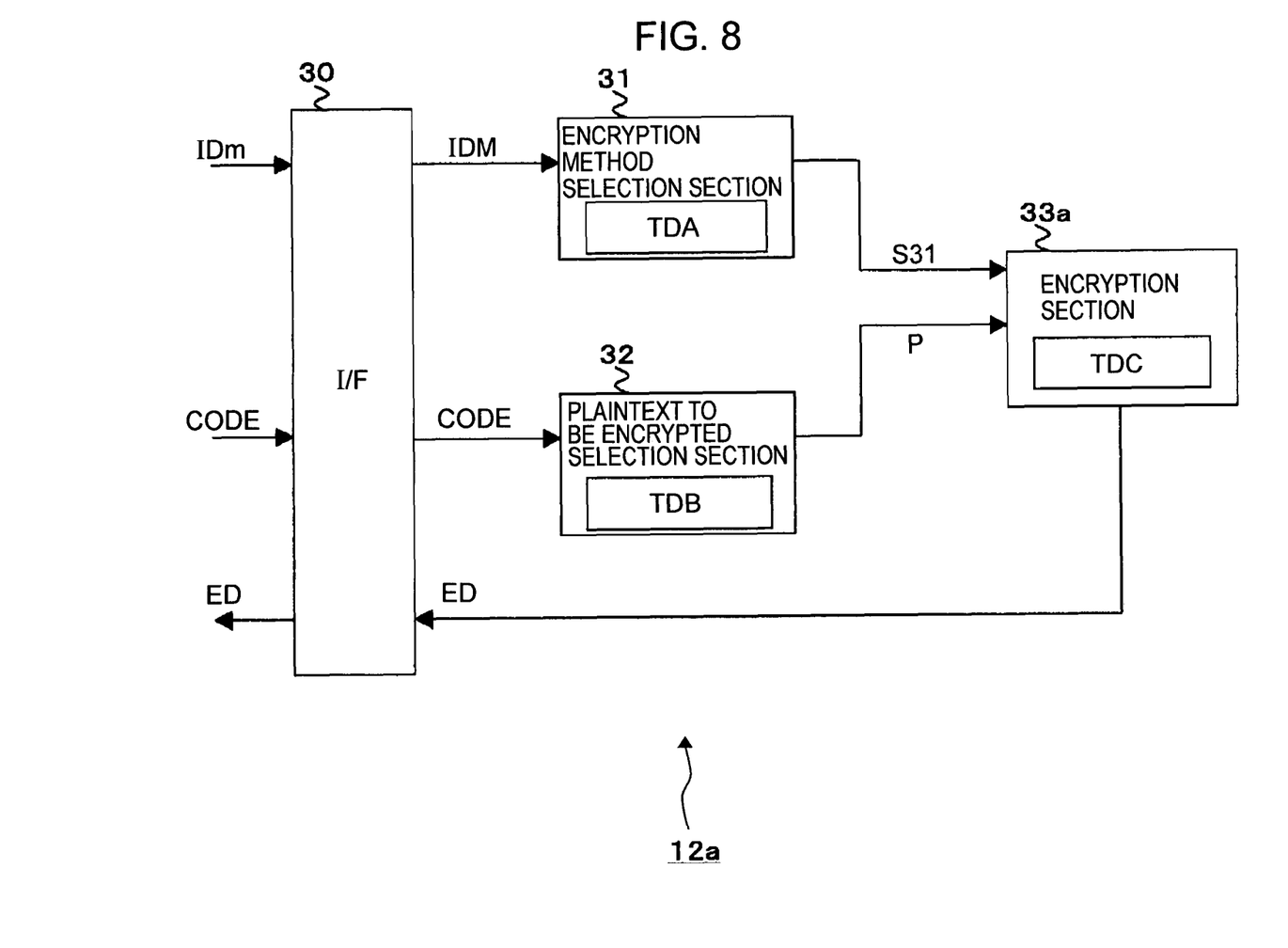
FIG. 8 is a block diagram of the SAM of the card system according to the first embodiment of the present invention.

In comparison, an encryption section 33a of a SAM 12a of this embodiment holds in advance encryption data such that plaintext data is encrypted by the encryption methods M1 to Mn with respect to the plaintext data P1 to Pm, respectively. Based on the plaintext data and selection data S31, the encryption section 33a obtains encryption data corresponding to them. That is, the encryption section 33a does not perform an encryption data generation process after the plaintext data P and the selection data S31 are input.

FIG. 8 is a block diagram of the SAM 12a of this embodiment. As shown in FIG. 8, the SAM 12a includes, for example, an interface 30, an encryption method selection section 31, a plaintext to be encrypted selection section 32, and the encryption section 33a. In this embodiment, the encryption section 33a is realized by, for example, an electronic circuit similarly to the interface 30, the encryption method selection section 31, and the plaintext to be encrypted selection section 32. Here, the interface 30, the encryption method selection section 31, and the plaintext to be encrypted selection section 32 designated with the same reference numerals as those in FIG. 4 are identical to those in the first embodiment.

The encryption section 33a is described below. The encryption section 33a has correspondence table data TDC.

Figure 9:
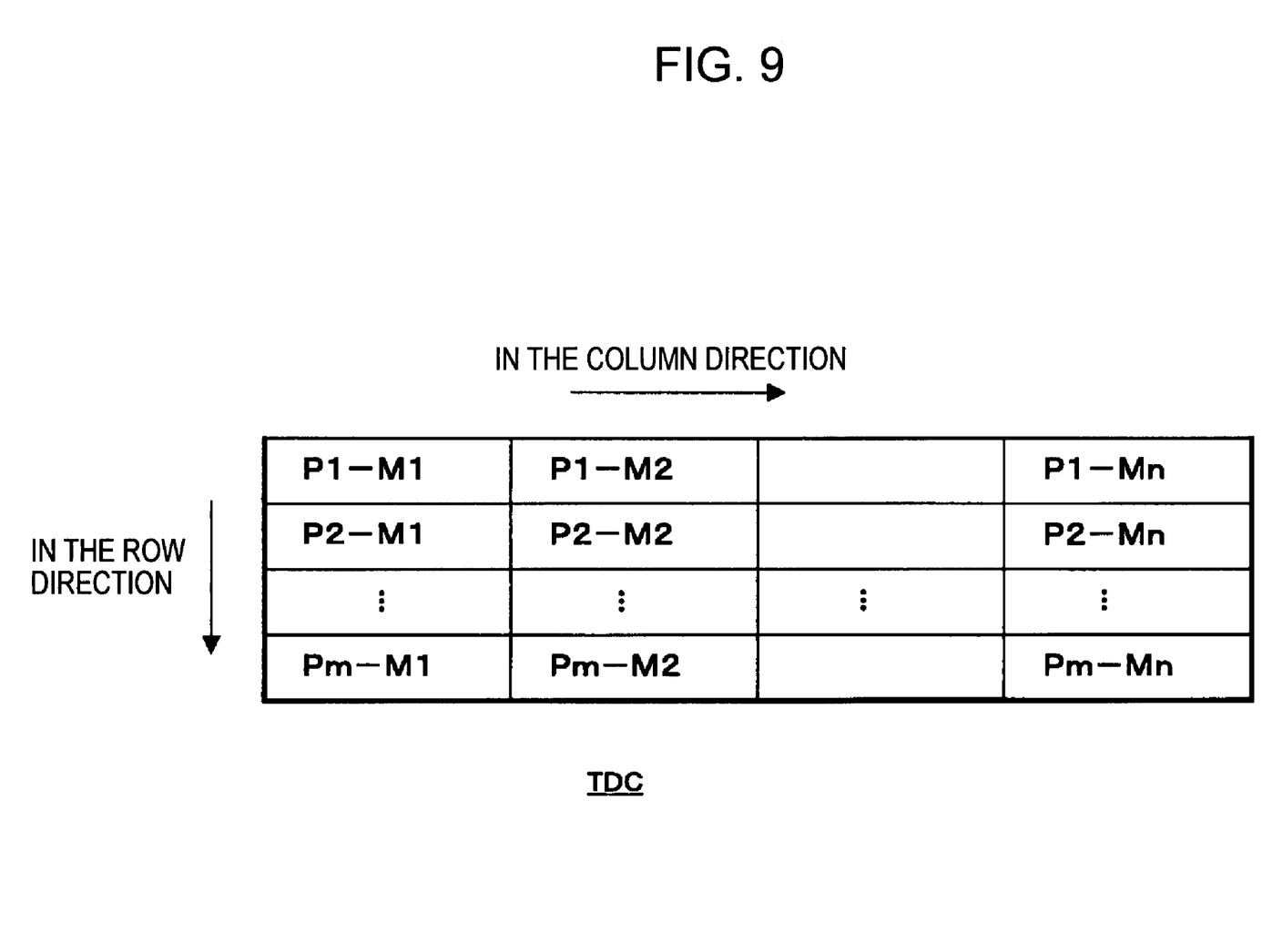
FIG. 9 illustrates correspondence table data TDC held by an encryption section shown in FIG. 8.

FIG. 9 illustrates the correspondence table data TDC shown in FIG. 8. In the correspondence table data TDC shown in FIG. 9, plaintext data P is shown in the row direction, and the encryption methods M are shown in the column direction. At the address specified by the row and the column, encryption data P-M obtained by encrypting the plaintext data P corresponding to the associated row by the encryption method M corresponding to the associated column is held. That is, the correspondence table data TDC defines the encryption data when the plaintext data is encrypted by the encryption methods M1 to Mn with regard to the plaintext data P1 to Pm, respectively.

By referring to the correspondence table data TDC shown in FIG. 9, the encryption section 33a obtains plaintext data Px input from the plaintext to be encrypted selection section 32 and encryption data P-M corresponding to an encryption method My indicated by the selection data S31 input from the encryption method selection section 31, and outputs them as the encryption data ED to the interface 30. In the above, x is one of the integers 1 to m, and y is one of the integers 1 to n.

The card system of this embodiment is identical to the card system 1 described with reference to the first embodiment except for the above-described configuration and operation of the encryption section 33a.

According to this embodiment, since the encryption section 33a does not obtain the encryption data ED on the basis of the correspondence table data TDC and does not perform the process for generating the encryption data ED, the processing time of the encryption section 33a can be shortened, and the encryption section 33a can be formed in a simple and small configuration.

Modification of the Second Embodiment

In the above-described second embodiment, an example of the correspondence table data TDC is described in which the encryption data when plaintext data is encrypted using all the encryption methods M1 to Mn are defined with regard to all the plaintext data P1 to Pm. Alternatively, correspondence table data TDC in which only the encryption data corresponding to some of the plaintext data or the encryption methods is specified with regard to at least one of the plaintext data P1 to Pm and the encryption methods M1 to Mn may be used.

In this case, when the encryption section 33a determines that the selection data S31 input from the encryption method selection section 31 and the encryption data corresponding to the plaintext data P input from the plaintext to be encrypted selection section 32 are defined in the correspondence table data TDC, the encryption section 33a obtains the encryption data on the basis of the correspondence table data TDC. On the other hand, when the encryption section 33a determines that the selection data S31 is not defined in the correspondence table data TDC, the encryption section 33a generates the encryption data by actually encrypting the plaintext data P by the encryption method indicated by the selection data S31 without using the correspondence table data TDC.

In the second embodiment, similarly to the modification of the first embodiment, the encryption method selection section 31 may generate selection data S31 indicating a plurality of encryption methods rather than a single encryption method from among the encryption methods M1 to Mn and the processing procedures thereof, and may output them to the encryption section 33a.

In this case, the encryption section 33a generates the encrypted data ED by performing an encryption process using a plurality of specified encryption methods on the plaintext data P input from the plaintext to be encrypted selection section 32 in accordance with the processing procedure specified by the selection data S31.

In the process for performing an encryption process based on a plurality of encryption methods in this manner, when the associated encryption data is defined in the correspondence table data TDC, the encryption section 33a obtains the encryption data from the correspondence table data TDC, and when the associated encryption data is not defined, the encryption section 33a does not cancel the encryption results up to that time, and generates the encryption data by actually encrypting the encryption data that is not defined in the subsequent correspondence table data TDC by using the encryption results.

In the second embodiment, the encryption section 33a may further encrypt encryption data obtained from the correspondence table data TDC by an encryption method determined in advance in order to generate the encryption data ED. Such an encryption may also be introduced when an upgrade is installed.

The present invention is not limited to the above-described embodiments. In the above-described embodiments, an example is described in which the encryption method selection section 31, the plaintext to be encrypted selection section 32, and the encryption sections 33 and 33a are realized as electronic circuits. Alternatively, all or some of them may be realized in such a manner that a data processing apparatus, such as a computer, performs corresponding steps within a program. In this case, for example, the procedures of steps ST3, ST4, and ST5 shown in FIG. 6 are written in the form of a program, and the data processing apparatus performs the steps, thereby realizing the first procedure, the second procedure, and the third procedure in accordance with the second aspect of the present invention.

In the above-described embodiments, an example is described in which the IC 15 of the IC card 10 is used as the authentication party of the present invention (the output source of the present invention). Alternatively, the authentication party may be a computer or the like.

The present application contains subject matter related to Japanese Patent Application No. JP 2004-004827 filed in the JPO on Jan. 9, 2004, the entire contents of which being incorporated hereby by reference.

What is claimed is:

1. An authentication apparatus configured to authenticate access from an external apparatus by generating encryption data on the basis of specified identification data, said authentication apparatus comprising:
   means for receiving first identification data and second identification data different from said first identification data from the external apparatus;
   first selection means for selecting an encryption method from among a plurality of different encryption methods on the basis of said first identification data;
   second selection means for selecting plaintext data to be encrypted from among a plurality of different pieces of plaintext data on the basis of said second identification data;
   encryption means for obtaining encryption data having said plaintext data selected by said second selection means encrypted by said encryption method selected by said first selection means, and said encryption means includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said first selection means and said second selection means, and when it is determined that encryption data of said combination corresponding to the selection results by said first selection means and said second selection means does not exist within said correspondence table data, said encryption means generates said encryption data by performing said encryption based on the selection results of said first selection means and said second selection means without utilizing the correspondence table data; and
   authentication means for authenticating the access from the external apparatus based on said encryption data.

2. The authentication apparatus according to claim 1, wherein said first selection means selects a plurality of said encryption methods and the processing procedures thereof as said encryption method used for said encryption of a single piece of said plaintext data, and
   said encryption means sequentially encrypts said plaintext data selected by said second selection means by using said plurality of encryption methods and the processing procedures thereof selected by said first selection means.

3. The authentication apparatus according to claim 1, wherein the encryption apparatus further comprises means for preventing external monitoring or tampering with internal storage and processing of data.

4. The authentication apparatus according to claim 1, wherein said plurality of different encryption methods have encryption strengths and amounts of encryption processing that differ.

5. The authentication apparatus according to claim 4, wherein different encryption strengths are caused by using key data of different data lengths for encryption.

6. A program stored in a non-transitory computer-readable storage medium that is configured to be read and executed by a data processing apparatus configured to generate encryption data to perform a method comprising:
   inputting first identification data and second identification data different from said first identification data from an external apparatus;
   selecting an encryption method from among a plurality of different encryption methods on the basis of said first identification data;
   selecting plaintext data to be encrypted from among a plurality of different pieces of plaintext data on the basis of said second identification data;
   obtaining encryption data such that said plaintext data selected in said plaintext data selecting step is encrypted by said encryption method selected in said encryption method selecting step,
   wherein said data processing apparatus includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said selecting an encryption method and said selecting plaintext data, and when it is determined that encryption data of said combination corresponding to the selection results does not exist within said correspondence table data, generating said encryption data by performing said encryption based on the selection results of selecting said encryption method and said plaintext data without utilizing the correspondence table data; and authenticating access from the external apparatus based on said encryption data.

7. A data processing method executed by a data processing apparatus configured to generate encryption data, said data processing method comprising:
inputting first identification data and second identification data different from said first identification data from an external apparatus;
selecting an encryption method from among a plurality of different encryption methods on the basis of said first identification data;
selecting plaintext data to be encrypted from among a plurality of different pieces of plaintext data on the basis of said second identification data;
obtaining encryption data such that said plaintext data selected in said selecting plaintext data step is encrypted by said encryption method selected in said selecting an encryption method step,
wherein said data processing apparatus includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said selecting an encryption method and said selecting plaintext data, and when it is determined that encryption data of said combination corresponding to the selection results does not exist within said correspondence table data, generating said encryption data by performing said encryption based on the selection results of selecting said encryption method and said plaintext data without utilizing the correspondence table data; and
authenticating access from the external apparatus based on said encryption data.

8. An authentication system comprising:
means for outputting first identification data and second identification data different from said first identification data from an external apparatus;
means for receiving and processing the first identification data and the second identification data to obtain encryption data, said means for receiving and processing including,
first selection means for selecting an encryption method from among a plurality of different encryption methods on the basis of said first identification data,
second selection means for selecting plaintext data to be encrypted from among a plurality of different pieces of the plaintext on the basis of said second identification data,
encryption means for obtaining encryption data such that said plaintext data selected by said second selection means is encrypted by said encryption method selected by said first selection means, and said encryption means includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said first selection means and said second selection means, and when it is determined that encryption data of said combination corresponding to the selection results by said first selection means and said second selection means does not exist within said correspondence table data, said encryption means generates said encryption data by performing said encryption based on the selection results of said first selection means and said second selection means without utilizing the correspondence table data; and
authentication means for authenticating access from the external apparatus based on said encryption data.

9. The authentication system according to claim 8, wherein the means for outputting first identification data and second identification data and the means for receiving and processing the first identification data and the second identification data function to provide mutual authentication there between.

10. The authentication system according to claim 9, wherein said first identification data is one of identification data unique to said means for outputting first identification data and second identification data, identification data indicating the security level of said authentication between said means for outputting first identification data and second identification data and the means for receiving and processing the first identification data and the second identification data, and identification data indicating the limit of the processing load of said authentication, and
said second identification data is identification data for identifying an object of said authentication.

11. The authentication system according to claim 8, wherein the means for outputting first identification data and second identification data different from said first identification data includes means for preventing external monitoring or tampering with internal storage and processing of data.

12. An authentication apparatus configured to authenticate access from an external apparatus by generating encryption data on the basis of specified identification data, said authentication apparatus comprising:
a processor;
an interface configured to receive first identification data and second identification data different from said first identification data from the external apparatus;
an encryption method selection module configured to select an encryption method from among a plurality of different encryption methods on the basis of said first identification data;
a plaintext to be encrypted selection module configured to select plaintext data to be encrypted from among a plurality of different pieces of the plaintext data on the basis of said second identification data;
an encryption module configured to obtain encryption data having said plaintext selected by said plaintext to be encrypted selection section encrypted by said encryption method selected by said encryption method selection module, and said encryption module includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said encryption method selection module and said plaintext to be encrypted selection module, and when it is determined that encryption data of said combination corresponding to the selection results by said encryption method selection module and said plaintext to be encrypted selection module does not exist within said correspondence table data, said encryption module generates said encryption data by performing said encryption based on the selection results of said encryption method selection module and said plaintext to be encrypted selection module without utilizing the correspondence table data; and an authentication module configured to authenticate the access from the external apparatus based on said encryption data.

13. The authentication apparatus according to claim 12, wherein the authentication apparatus is further configured to prevent external monitoring or tampering with internal storage and processing of data.

14. The authentication apparatus according to claim 12, further comprising:

an outputting module configured to output the first identification data and the second identification data, wherein the outputting module and the interface function to provide mutual authentication there between, and wherein said first identification data is one of identification data unique to said outputting module, identification data indicating the security level of said authentication between said outputting module and the interface, and identification data indicating the limit of the processing load of said authentication, and said second identification data is identification data for identifying an object of said authentication.

15. The authentication apparatus according to claim 12, wherein said encryption method selection module selects a plurality of said encryption methods and the processing procedures thereof as said encryption method used for said encryption of a single piece of said plaintext data, and said encryption module sequentially encrypts said plaintext data selected by said plaintext to be encrypted selection module by using said plurality of encryption methods and the processing procedures thereof selected by said encryption method selection module.

16. An authentication system, comprising:

a processor;

an output source configured to output first identification data and second identification data different from said first identification data;

an application module configured to receive and process the first identification data and the second identification data to obtain encryption data, said application module including, an interface configured to receive first identification data and second identification data different from said first identification data from an external apparatus, an encryption method selection module configured to select an encryption method from among a plurality of different encryption methods on the basis of said first identification data, a plaintext to be encrypted selection module configured to select plaintext data to be encrypted from among a plurality of different pieces of plaintext data on the basis of said second identification data;

an encryption module configured to obtain encryption data having said plaintext selected by said plaintext to be encrypted selection section encrypted by said encryption method selected by said encryption method selection module, and said encryption module includes correspondence table data indicating different combinations of at least one of said plurality of different encryption methods and said plurality of different pieces of plaintext data and said encryption data corresponding to each combination, obtains said encryption data from a particular combination included in the correspondence table data corresponding to selection results by said encryption method selection module and said plaintext to be encrypted selection module, and when it is determined that encryption data of said combination corresponding to the selection results by said encryption method selection module and said plaintext to be encrypted selection module does not exist within said correspondence table data, said encryption module generates said encryption data by performing said encryption based on the selection results of said encryption method selection module and said plaintext to be encrypted selection module without utilizing the correspondence table data; and an authentication module configure to authenticate the access from the external apparatus based on said encryption data.

17. The authentication system according to claim 16, wherein the output source and the application module function to provide mutual authentication there between.

* * * * *